No. 788,568. PATENTED MAY 2, 1905.
H. H. WELSH, Jr.
MACHINE FOR APPLYING NIPPLES TO HOSE.
APPLICATION FILED MAY 18, 1901.
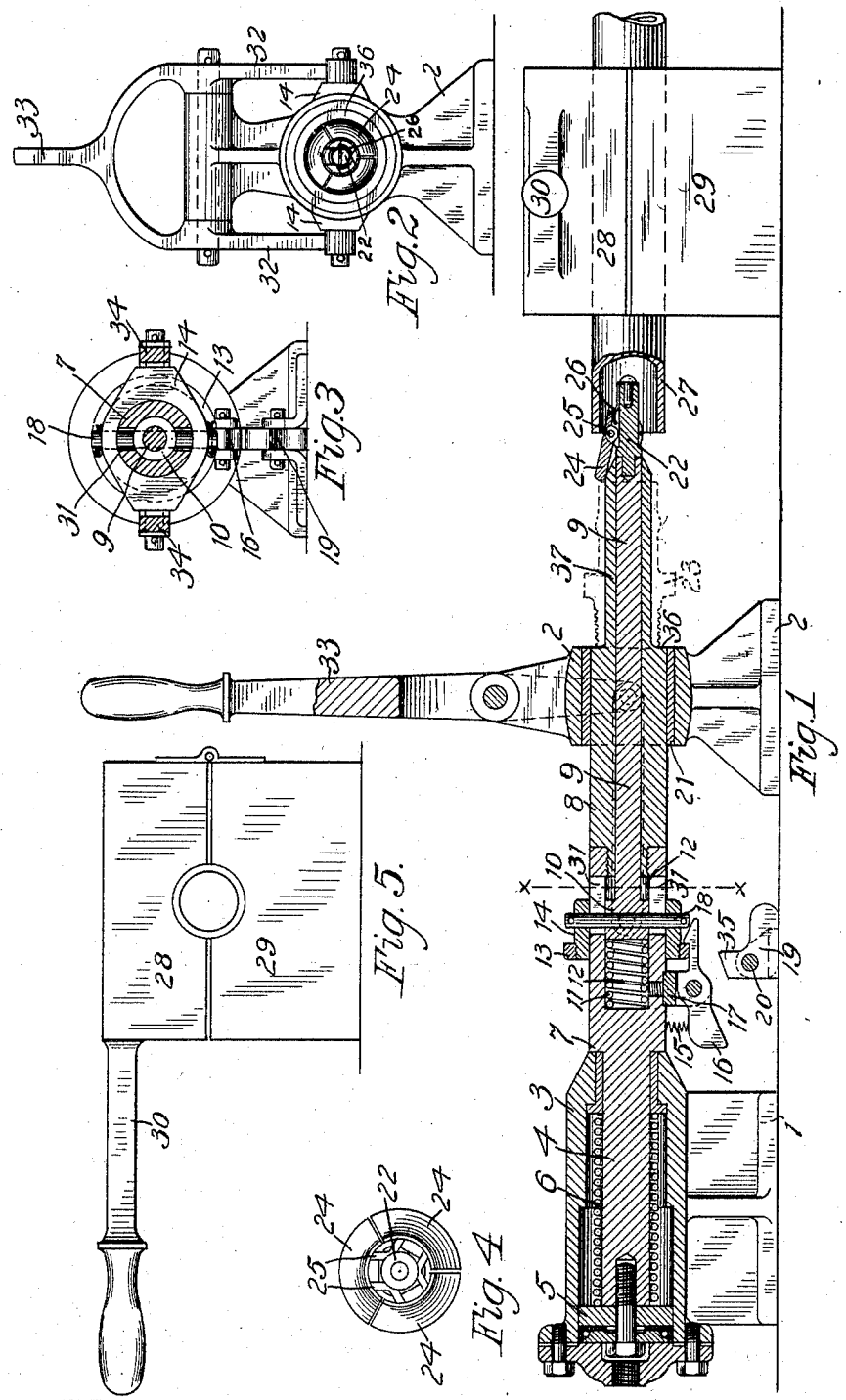
WITNESSES:
Jas. B. MacDonald
INVENTOR,
Harvey H. Welsh Jr.
by E. H. Wright
Att'y.

No. 788,568. Patented May 2, 1905.

UNITED STATES PATENT OFFICE.

HARVEY H. WELSH, JR., OF WILMERDING, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

MACHINE FOR APPLYING NIPPLES TO HOSE.

SPECIFICATION forming part of Letters Patent No. 788,568, dated May 2, 1905.

Application filed May 18, 1901. Serial No. 60,838.

*To all whom it may concern:*

Be it known that I, HARVEY H. WELSH, Jr., a citizen of the United States, residing at Wilmerding, county of Allegheny, State of Pennsylvania, have invented or discovered a certain new and useful Improvement in Machines for Applying Nipples to Hose, of which improvement the following is a specification.

The object of my invention is to provide a machine for applying nipples to hose, and is particularly adapted to be used in connection with air-brake or other apparatus in which a screw-threaded nipple is employed for attaching the flexible hose to the end of the train-pipe upon a car. The inner diameter of the hose is usually less than the outer diameter of the shank of the nipple, so that it requires a certain amount of power to insert the nipple into the end of the hose.

My invention consists in an improved mechanism by which the shank of the nipple and the end of the hose may be forced together and also in means for expanding the end of the hose at the time the nipple is being inserted.

My invention also consists in certain combinations and arrangement of parts, as hereinafter more fully set forth.

In the accompanying drawings, which illustrate an embodiment of my invention, Figure 1 is a central longitudinal section of my improved machine, showing also a piece of hose clamped in position to receive the nipple, which is indicated in dotted lines. Fig. 2 is an end elevation. Fig. 3 is a transverse section taken on the line $x\ x$ of Fig. 1. Fig. 4 is an end elevation of the expander on a larger scale, and Fig. 5 is a side view of the clamp for holding the hose in position.

The machine is mounted on two standards 1 and 2, which may be secured on a bench or any other suitable support. The cylinder 3, which is carried by the standard 1, is provided with a piston 5, spring 6, and piston-rod 4, which passes through one end of the cylinder and terminates in an enlarged end 7. This end 7 of the piston-rod is secured to a sleeve 8, which slides in a bearing in the standard 2, having a bushing 21. In the enlarged end 7 of the piston-rod is formed a recess 12, in which the head 10 of the spindle 9 is adapted to slide. There is also a coiled spring 11 located between one end of the recess and the head 10 of the spindle, and this normally forces said head to the opposite end of the recess. A collar 14 is mounted to slide on the rod 7 and is connected with the head 10 of the spindle by means of a pin 18. Slots 31 are formed in the rod 7 at the recess 12, and the pin 18 passes through the collar 14, head 10, and the slots 31, which are of sufficient length to accommodate the movement of the pin. The pin is secured by means of cotters or in any other convenient way. The collar 14 is also provided with a latch-ring 13, which is screwed or otherwise fastened thereon. The latch 16 is pivoted to the lug 17, which is secured to the under side of the rod 7. A light spring 15 normally holds the latch in a position to engage the ring 13 of the collar 14.

A trip 19 is pivoted at 20 to a stationary support on the bench and has an upward extension 35, which projects into the path of the latch 16.

A hand-lever 33, which is bifurcated at its lower end, is pivoted to an upward extension of the standard 2, and the downwardly-projecting arms 32 are attached to the connecting-rods 34, which are pivotally secured at their other ends to the collar 14, as shown in Figs. 2 and 3.

The forward end 37 of the sleeve 8 is reduced in diameter, thus forming a shoulder 36, against which the nipple 23 bears when placed over the reduced end 37, as indicated in dotted lines in Fig. 1. The spindle 9 passes entirely through the sleeve 8 and at its forward end is attached an expansible head having three conical sections or wings 24, each of which is pivoted to a lug 25 on the head 22. The forward end of the reduced portion 37 of the sleeve is made tapering, so that the bases of the conical sections will slide out thereon and the expander will be spread when the spindle 9 is drawn into the sleeve 8 by means of the hand-lever 33.

A spring 26 is secured under the forward end of each of the conical sections 24 and operates to contract the expander when the latter is moved forward away from engagement with the tapering end of sleeve 37.

Any suitable clamp may be used for holding the hose in position.

I have shown a simple clamp composed of two blocks of wood 28 and 29, hinged together horizontally and provided with a cylindrical opening, a part of which is in each block, and of the proper diameter to accommodate the hose 27. The upper section or block 28 is provided with a handle 30, by which the clamp is opened and closed. The clamp is secured on the bench at the desired distance in front of the expander 22.

The operation is then as follows: The nipple 23 is placed over the reduced portion 37 of the sleeve with its screw-threaded end against the shoulder 36. The handle is then moved toward the right, thus sliding the collar 14 to the left on the rod 7 until the ring 13 is engaged and held by the latch 16. The spindle 9 and head 10 being rigidly secured to the collar 14 by means of pin 18 move with the collar 14 and compress the spring 11 in the recess 12. At the same time the bases of the conical sections 24 slide out on the tapering end of sleeve 37 and spread the expander to its widest position, compressing the springs 26. In this position the base of the conical expander is in close proximity to the end of the shank of the nipple and its diameter is equal to or preferably a little greater than that of the nipple-shank. The hose is now placed on the end of the expander and held securely in the clamp. The air or other fluid pressure is then admitted to the cylinder 3, forcing the piston 5 to the right. This carries the expander into the end of the hose, spreading the same open, so that the shank of the nipple passes easily into the hose. The rod 7, sleeve 8, spindle 9, expander 22, and nipple 23 all move forward, together with the piston, until the flange of the nipple arrives at the end of the hose. At the same time the end of the latch 16 engages the upward projection 35 of the trip 19, compresses spring 15, disengages the latch 16 from the ring 13, and releases the spring 11. The head 10 and spindle 9 are then thrown forward in the sleeve 8 by means of the spring 11, and the head 22 is also moved forward, so that the springs 26 will force the bases of the conical sections inward as they slide upon the tapering end of the sleeve. The expander is now contracted, and the hose and nipple may be easily removed from the spindle by opening the clamp. The air is then exhausted from the cylinder 5, and the spring 6 returns the parts to the first position. The trip 19 turns upon pivot 20 and allows the latch 16 to pass freely on the return stroke.

While I have specifically described the preferred form of my machine, my invention is not limited to such specific construction, but is intended to cover any device for automatically expanding the end of the hose and forcibly inserting the shank of the nipple into the hose.

What I claim as new, and desire to secure by Letters Patent, is—

1. A machine for applying nipples to hose, comprising an expander having a diameter as great as that of the nipple for the end of the hose and means for forcing the nipple and the hose together.

2. In a machine for applying nipples to hose, the combination, of an expander for the end of the hose, means for forcing the nipple and hose together, and means for releasing the expander.

3. In a machine for applying nipples to hose, the combination, of an expander for the end of the hose, means for forcing the nipple and hose together, and automatically-operated means for releasing the expander.

4. In a machine for applying nipples to hose, the combination, of a sleeve for carrying the nipple, a spindle within the sleeve, an expansible head carried by the spindle and means for forcing the nipple and hose together.

5. In a machine for applying nipples to hose, the combination, of a sleeve having a shoulder for engaging the end of the nipple, a spindle passing through the sleeve and an expansible head carried by the spindle.

6. In a machine for applying nipples to hose, the combination, of a sleeve adapted to hold the nipple, a spindle, an expansible head carried by the spindle and means for moving the spindle with relation to the sleeve.

7. In a machine for applying nipples to hose, the combination, of a sleeve adapted to hold the nipple, a spindle within the sleeve and having motion relative thereto, an expansible head carried by the spindle, and means for locking the sleeve and spindle together.

8. In a machine for applying nipples to hose, the combination, of a sleeve adapted to hold the nipple, a spindle within the sleeve, an expansible head carried by the spindle, a locking device for holding the expander open while the nipple is forced into the hose and means for releasing the expander.

9. In a machine for applying nipples to hose, the combination, of a sleeve for carrying the nipple, a spindle within the sleeve, an expander carried by the spindle, a latch for holding the expander open and a trip device and spring for automatically releasing the expander.

10. In a machine for applying nipples to hose, the combination, of a sleeve for carrying the nipple, an expander for the hose, means for forcing the sleeve and expander into the hose, a clamp for holding the hose and means for releasing the expander.

11. In a machine for applying nipples to hose, the combination, of a sleeve for carrying the nipple, a spindle, an expander carried by the spindle and a cylinder and a piston for forcing the nipple and expander into the hose.

12. A machine for applying nipples to hose, comprising a spindle on which the nipple is adapted to be mounted, a plurality of wings or sections pivoted on the spindle, and means for extending the sections.

13. A machine for applying nipples to hose, comprising a sleeve having a tapered or conical end, a spindle within said sleeve, an expansible head carried by the spindle and adapted to be expanded by contact with the tapered end of the sleeve.

14. A machine for applying nipples to hose, comprising a carrier having a tapered end and adapted to hold the nipple, a clamp for holding the hose and means for forcing the nipple into the hose.

In testimony whereof I have hereunto set my hand.

H. H. WELSH, Jr.

Witnesses:
E. A. WRIGHT,
R. F. EMERY.